United States Patent
Nishioka et al.

(10) Patent No.: US 7,304,109 B2
(45) Date of Patent: Dec. 4, 2007

(54) RUBBER COMPOSITION AND TIRE USING THE SAME

(75) Inventors: Kazuyuki Nishioka, Kobe (JP);
Takahiro Mabuchi, Kobe (JP);
Katsumi Terakawa, Kobe (JP);
Kiyoshige Muraoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/140,733

(22) Filed: Jun. 1, 2005

(65) Prior Publication Data

US 2006/0004136 A1   Jan. 5, 2006

(30) Foreign Application Priority Data

Jul. 2, 2004   (JP) .............................. 2004-196677

(51) Int. Cl.
*C08L 25/10* (2006.01)
(52) U.S. Cl. ........................ 525/240; 526/335; 526/347
(58) Field of Classification Search ................ 525/241; 526/335, 347
See application file for complete search history.

(56) References Cited

U.S. PATENT DOCUMENTS

2006/0167160 A1   7/2006   Nakagawa et al.

FOREIGN PATENT DOCUMENTS

| EP | 0 502 728 A1 | 9/1992 |
|---|---|---|
| EP | 0 585 012 A1 | 3/1994 |
| EP | 1 253 170 A1 | 10/2002 |
| EP | 1 535 959 A2 | 6/2005 |
| JP | 63-101440 A | 5/1988 |
| JP | 9-278944 A | 10/1997 |
| JP | 2000-129037 A | 5/2000 |
| JP | 2003-89731 A | 3/2003 |
| JP | 2003-253051 A | 9/2003 |
| WO | WO-2004/000931 A1 | 12/2003 |
| WO | WO 2004000931 A1 * | 12/2003 |
| WO | WO-2004/011545 A1 | 2/2004 |

* cited by examiner

*Primary Examiner*—Robert D. Harlan
(74) *Attorney, Agent, or Firm*—Birch, Stewart, Kolasch & Birch, LLP

(57) ABSTRACT

The present invention provides a rubber composition, in which abrasion resistance and gripping performance are improved in a balanced manner and bleeding of the components is inhibited, and a tire using the composition. Specifically, the present invention provides a rubber composition comprising (B) 10 to 200 parts by weight of a low molecular weight aromatic vinyl-conjugated diene copolymer having weight average molecular weight of $1.0 \times 10^3$ to $1.0 \times 10^5$ and aromatic vinyl content of 10 to 75% by weight, wherein the hydrogenation ratio of double bonds in the conjugated diene part is 20 to 60%, based on (A) 100 parts by weight of a rubber component containing at least 60% by weight of a styrene-butadiene copolymer having weight average molecular weight of $5.0 \times 10^5$ to $2.5 \times 10^6$ and styrene content of 20 to 60% by weight, wherein the amount of vinyl bonds in the butadiene part is 20 to 70%; which satisfies the following equation 5% by weight $< Bv < (As + 10\%$ by weight$)$ when As (% by weight) is the styrene content of copolymer (A) and Bv (% by weight) is the aromatic vinyl content in the butadiene part of copolymer (B), and a tire using the same.

4 Claims, No Drawings

RUBBER COMPOSITION AND TIRE USING THE SAME

BACKGROUND OF THE INVENTION

The present invention relates to a rubber composition in which abrasion resistance and gripping performance are improved in a balanced manner and bleeding of the components is inhibited, and a tire using the composition.

In tread rubber of high performance tires such as racing tires, usually both high gripping performance and abrasion resistance are required.

Conventionally, as rubber compositions for a tire having high gripping performance, known are a rubber composition containing styrene-butadiene copolymer rubber (SBR) having a high glass transition temperature (Tg) as the rubber component; a rubber composition in which process oil is substituted with an equivalent amount of a resin having a high softening point which is added to the rubber component; a rubber composition in which a large amount of a softening agent or carbon black is added; a rubber composition in which carbon black having small particle size is used and a rubber composition in which a combination of SBR, a resin having a high softening point, a softening agent or carbon black is compounded. However, a rubber composition in which SBR having high Tg is used has the problem that temperature dependency is large and the influence of temperature change on performance becomes large. When process oil is substituted with an equivalent amount of a resin having a high softening point, there is the problem that temperature dependency increases by influence of the resin having a high softening point when the substituted amount is large. Furthermore, in the case that carbon black having small particle size or a large amount of a softening agent is used, there is the problem that dispersability of carbon black is poor and abrasion resistance decreases.

In order to solve the above problems, a rubber composition containing low molecular weight styrene-butadiene copolymer has been proposed (see JP-A-63-101440). However, because low molecular weight styrene-butadiene copolymer has some crosslinkable double bonds, a part of the low molecular weight component crosslinks with the matrix rubber component and is introduced into the matrix. As a result, there is the problem that hysteresis loss cannot sufficiently be suppressed. Also, in the case that double bonds are made into saturated bonds by hydrogenation in order to prevent the low molecular weight component from being introduced into the matrix by crosslinking, compatibility with the matrix decreases significantly. Consequently, there are problems such as decrease in destruction resistance properties and bleeding of the low molecular weight component.

SUMMARY OF THE INVENTION

The present inventions aims to provide a rubber composition in which abrasion resistance and gripping performance are improved in a highly balanced manner and bleeding of the components is inhibited, and a tire using the composition.

The present invention relates to a rubber composition comprising (B) 10 to 200 parts by weight of a low molecular weight aromatic vinyl-conjugated diene copolymer having weight average molecular weight of $1.0 \times 10^3$ to $1.0 \times 10^5$ and aromatic vinyl content of 10 to 75% by weight, wherein the hydrogenation ratio of double bonds in the conjugated diene part is 20 to 60%, based on (A) 100 parts by weight of a rubber component containing at least 60% by weight of a styrene-butadiene copolymer having weight average molecular weight of $5.0 \times 10^5$ to $2.5 \times 10^6$ and styrene content of 10 to 60% by weight, wherein the amount of vinyl bonds in the butadiene part is 20 to 70%; which satisfies the following equation $$5\% \text{ by weight} < Bv < (As + 10\% \text{ by weight})$$

when As (% by weight) is the styrene content of styrene-butadiene copolymer (A) and Bv (% by weight) is the aromatic vinyl content in the butadiene part of low molecular weight aromatic vinyl conjugated diene copolymer (B).

The amount of vinyl bonds in the butadiene part of the styrene-butadiene copolymer (A) is preferably 20 to 60%.

Also, the present invention relates to a tire comprising the rubber composition.

DETAILED DESCRIPTION

The rubber composition of the present invention comprises a rubber component containing a styrene-butadiene copolymer (A) and a low molecular weight aromatic vinyl-conjugated diene copolymer (B).

The content of the styrene-butadiene copolymer (A) (hereinafter referred to as copolymer (A)) in the rubber component is at least 60% by weight, preferably at least 80% by weight, most preferably 100% by weight. When the content is less than 60% by weight, gripping performance is insufficient. The content of the styrene-butadiene copolymer (A) in the rubber component can be 100% by weight.

The weight average molecular weight of copolymer (A) is at least $5.0 \times 10^5$, preferably at least $7.5 \times 10^5$. When the weight average molecular weight is less than $5.0 \times 10^5$, abrasion resistance decreases. Also, the weight average molecular weight is at most $2.5 \times 10^6$, preferably $2.0 \times 10^6$. When the weight average molecular weight is more than $2.5 \times 10^6$, processability decreases.

The styrene content of copolymer (A) is at least 10% by weight, preferably at least 15% by weight, more preferably at least 20% by weight in the styrene-butadiene copolymer (A). When the styrene content is less than 10% by weight, gripping performance decreases. Also, the styrene content is at most 60% by weight, preferably at most 50% by weight. When the content is more than 60% by weight, abrasion resistance and gripping performance at a low temperatures decrease.

The amount of vinyl bonds in the butadiene part of copolymer (A) is at least 20%, preferably at least 30%. When the amount of vinyl bonds is less than 20%, gripping performance decreases. Also, the amount of vinyl bonds is at most 70%, preferably at most 60%. When the amount is more than 70%, abrasion resistance and gripping performance at a low temperature decrease.

The rubber component of the present invention can contain a rubber component other than the above styrene-butadiene copolymer (A). Examples of the other rubber component are cis-1,4-polyisoprene, low cis-1,4-polybutadiene, high cis-1,4-polybutadiene, ethylene-propylene-diene rubber, chloroprene, halogenated butyl rubber, acrylonitrile-butadiene rubber and natural rubber, but are not limited thereto. Also, styrene-butadiene rubber having styrene content outside the styrene content range of the styrene-butadiene copolymer (A) can be used as the other rubber component. One or at least two kinds of the above other rubber components can be included in the rubber component of the present invention.

Examples of the aromatic vinyl component in low molecular weight aromatic vinyl-conjugated diene copolymer (B) (hereinafter referred to as copolymer (B)) are vinyl aromatic hydrocarbon monomers such as styrene, α-methylstyrene, 1-vinyl naphthalene, 3-vinyl toluene, ethyl vinyl benzene, divinyl benzene, 4-cyclohexyl styrene and 2,4,6-trimethyl styrene. These can be used alone or two or more can be used together. Of these, styrene is preferably used as the aromatic vinyl component.

Examples of the conjugated diene component in copolymer (B) are 1,3-butadiene, isoprene, 1,3-pentadiene, 2,3-dimethylbutadiene and 2-phenyl-1,3-butadiene. These can be used alone or two or more kinds can be used together. Of these, 1,3-butadiene is preferably used as the conjugated diene component.

The weight average molecular weight of copolymer (B) is at least $1.0 \times 10^3$, preferably at least $2.0 \times 10^3$. When the weight average molecular weight is less than $1.0 \times 10^3$, abrasion resistance is insufficient. Also, the weight average molecular weight is at most $1.0 \times 10^5$, preferably $8.0 \times 10^4$. When the weight average molecular weight is more than $1.0 \times 10^5$, gripping performance cannot sufficiently be obtained.

The aromatic vinyl content of copolymer (B) is at least 10% by weight, preferably at least 20% by weight. When the aromatic vinyl content is less than 10% by weight, gripping performance cannot sufficiently be obtained. Also, the aromatic vinyl content of copolymer (B) is at most 75% by weight, preferably at most 50% by weight. When the aromatic vinyl content is more than 75% by weight, abrasion resistance decreases.

The hydrogenation ratio of double bonds in the conjugated diene part of copolymer (B) is at least 20%, preferably at least 30%, more preferably at least 40%, further preferably at least 43% particularly preferably at least 45%. When the hydrogenation ratio is lower than 20%, gripping performance cannot sufficiently be obtained, as copolymer (B) is introduced into the matrix rubber component. Also, the hydrogenation ratio is at most 60%, preferably at most 55%, more preferably at most 50%. When the hydrogenation ratio is higher than 60%, the rubber composition becomes hard, gripping performance and abrasion resistance cannot sufficiently be obtained and the components may bleed out. Herein, the hydrogenation ratio refers to the proportion of conjugated diene parts having hydrogenated double bonds based on the total conjugated diene parts of copolymer (B).

The content of copolymer (B) is at least 10 parts by weight, preferably at least 15 parts by weight, more preferably at least 20 parts by weight, based on 100 parts by weight of the rubber component. When the content is less than 10 parts by weight, gripping performance cannot sufficiently be obtained. Also, the content is at most 200 parts by weight, preferably at most 180 parts by weight, more preferably at least 150 parts by weight. When the content is at most 200 parts by weight, not only processability but also abrasion resistance decrease.

The composon of the present invention satisfies the following equation $$5\% \text{ by weight} < Bv < (As + 10\% \text{ by weight})$$

when As (% by weight) is the styrene content of copolymer (A) and Bv (% by weight) is the aromatic vinyl content of low molecular waseight aromatic vinyl conjugated diene copolymer (B).

The lower limit of Bv is preferably 5% by weight, more preferably 10% by weight, further preferably 15% by weight. When Bv is less than 5% by weight, gripping performance cannot sufficiently be obtained and also, the components may bleed out. The upper limit of Bv is preferably (As+10% by weight), more preferably (As+8% by weight), further preferably (As+5% by weight). When Bv is more than (As+10% by weight), the change in performance and properties due to temperature change is large and sufficient gripping performance at low temperatures cannot be obtained.

The rubber composition of the present invention preferably further contains a reinforcing filler. As the reinforcing filler, any filler that is normally used in the conventional rubber composition for a tire can be used and mainly, carbon black is preferable.

The nitrogen-adsorbing specific surface area ($N_2SA$) of the carbon black is preferably at least 80 $m^2/g$, more preferably at least 100 $m^2/g$. When $N_2SA$ of the carbon black is less than 80 $m^2/g$, both gripping performance and abrasion resistance tend to be poor. Also, $N_2SA$ of the carbon black is preferably at most 280 $m^2/g$, more preferably at most 200 $m^2/g$. When $N_2SA$ of the carbon black is more than 280 $m^2/g$, dispersability cannot sufficiently be obtained and abrasion resistance tends to become poor.

The content of carbon black is preferably at least 10 parts by weight, more preferably at least 20 parts by weight, based on 100 parts by weight of the rubber component. When the content of carbon black is less than 10 parts by weight, abrasion resistance tends to decrease. Also, the content of carbon black is preferably at most 200 parts by weight, more preferably at most 150 parts by weight. When the content is more than 200 parts by weight, processability tends to decrease.

The reinforcing filler can be used alone or two or more kinds can be used together.

Furthermore, besides the above components, the rubber composition of the present invention can contain various chemicals that are usually used in the rubber industry, for example additives such as a vulcanizing agent including sulfur, vulcanization accelerators, softening agents, antioxidants, stearic acid, zinc oxide and antiozonants.

Among the tire parts, the rubber composition of the present invention is preferably used for the tread.

The tire of the present invention is prepared by the usual method using the rubber composition of the present invention. That is, the rubber composition of the present invention to which the above chemicals are compounded when necessary is extruded into the shape of each part of a tire before vulcanization and molded by the usual method on a tire forming machine to form an unvulcanized tire. The unvulcanized tire is heated and pressurized in a vulcanizer to obtain a tire.

Hereinafter, the present invention is explained in more detail based on Examples, but the present invention is not limited thereto.

<Synthesis of Copolymer A>

(Synthesis of Styrene-Butadiene Copolymer A-1)

A nitrogen-replaced 2 liter autoclave equipped with a stirring blade was charged with 1000 g of cyclohexane, 20 g of tetrahydrofuran (THF), 80 g of 1,3-butadiene and 40 g of styrene and temperature in the autoclave was adjusted to 25° C. Then, 0.05 g of n-butyl lithium was added and polymerization was conducted for 60 minutes while increasing the temperature. The conversion ratio of the monomers was confirmed to be 99%. Thereafter, 1.5 g of 2,6-di-t-butyl-p-cresol was added as the antioxidant.

(Synthesis of Styrene-Butadiene Copolymer A-2 and A-3)

The copolymers were prepared in the same manner as above except that the amounts of the monomers and the catalyst were changed.

The weight average molecular weight (Mw) of the obtained copolymer A was measured using a GPC-8000 series machine made by Tosoh Corporation and a differential refractometer as the detector and the molecular weight was calibrated by standard polystyrene. The microstructure of the copolymers was found by measuring $^1$H-NMR at 25° C. using a JEOL JNM-A 400 NMR machine and the composition of the copolymers was determined from the ratio of phenyl protons based on styrene units at 6.5 to 7.2 ppm and methylene protons of the vinyl bonds based on butadiene units at 4.9 to 5.4 ppm, calculated from the $^1$H-NMR spectrum.

The results are shown in Table 1.

TABLE 1

|  | Copolymer | | |
| --- | --- | --- | --- |
|  | A-1 | A-2 | A-3 |
| Styrene content (% by weight) | 33 | 28 | 5 |
| Amount of vinyl bonds (%) | 48 | 46 | 47 |
| Weight average molecular weight (Mw) | 720000 | 1280000 | 810000 |

<Synthesis of Copolymer B>

(Synthesis of Low Molecular Weight Aromatic Vinyl-Conjugated Diene Copolymer B-0)

A nitrogen-replaced 2 liter autoclave equipped with a stirring blade was charged with 1000 g of cyclohexane, 20 g of tetrahydrofuran (THF), 150 g of 1,3-butadiene and 50 g of styrene and temperature in the autoclave was adjusted to 25° C. Then, 2.0 g of n-butyl lithium was added and polymerization was conducted for 15 minutes while increasing the temperature. The conversion ratio of the monomers was confirmed to be 99%. Thereafter, 1.5 g of 2,6-di-t-butyl-p-cresol was added as the antioxidant.

(Synthesis of Low Molecular Weight Aromatic Vinyl-Conjugated Diene Copolymer B-1)

A pressure resistance vessel was charged with 200 g of copolymer B-0, 300 g of THF and 10 g of 10% palladium carbon. After the inside of the vessel was replaced with nitrogen, the inside of the vessel was replaced with hydrogen so that the pressure became 5.0 kg/cm$^2$ and reaction was conducted at 80° C. The hydrogenation ratio was calculated from the spectrum decrease of unsaturated bonds in the 100 MHz proton NMR spectrum measured at a concentration of 15% by weight using carbon tetrachloride as the solvent.

(Synthesis of Copolymers B-2 to B-5)

The copolymers were synthesized in the same manner as above, except that the ratio of the charged monomers, the amount of catalyst and the hydrogen pressure were changed.

The weight average molecular weight (Mw) and the microstructure of the obtained copolymer B were measured in the same manner as for copolymer A. The hydrogenation ratio was calculated from methyl protons of the hydrogenated vinyl bonds at 0.6 to 1.0 ppm, methylene protons of the vinyl bonds that are not hydrogenated at 4.7 to 5.2 ppm and methyne protons of the cis and trans structures and vinyl bonds that are not hydrogenated at 5.2 to 5.8 ppm.

The results are shown in Table 2.

TABLE 2

|  | Copolymer | | | | | |
| --- | --- | --- | --- | --- | --- | --- |
|  | B-0 | B-1 | B-2 | B-3 | B-4 | B-5 |
| Styrene content (% by weight) | 25 | 25 | 46 | 4 | 24 | 26 |
| Weight average molecular weight | 11500 | 11000 | 10700 | 11200 | 12100 | 11600 |
| Hydrogenation ratio (%) | 0 | 48 | 51 | 52 | 85 | 10 |

EXAMPLES 1 TO 2 AND COMPARATIVE EXAMPLES 1 TO 6

The various chemicals used in Examples and Comparative Examples are described below.

Carbon black: SHOWBLACK N110 available from Showa Cabot Co. Ltd. (N$_2$SA: 143 m$^2$/g)

Softening agent: Diana Process Oil AH-16 available from Idemitsu Kosan Co., Ltd.

Stearic acid: Stearic acid available from NOF Corporation

Zinc oxide: Zinc Oxide type 1 available from Mitsui Mining and Smelting Co., Ltd.

Antioxidant: NOCRAC 6C available from Ouchi Shinko Chemical Industrial Co., Ltd.

Sulfur: powdery sulfur available from Tsurumi Chemicals Co., Ltd.

Vulcanization accelerator: Nocceler CZ available from Ouchi Shinko Chemical Industrial Co., Ltd.

The chemicals were kneaded and mixed according to the compositions shown in Table 3 to obtain each sample rubber composition. The compositions were press vulcanized at 170° C. for 20 minutes to obtain vulcanized rubber and the following tests of properties of the rubber were conducted.

Evaluation of the vulcanized rubber is described below.

(Gripping Performance)

The obtained vulcanized rubber was evaluated using a flat belt-type friction tester (FR 5010 model) made by Ueshima Seisakusho. A cylindrical rubber specimen having width of 20 mm and diameter of 100 mm was cut out from the vulcanized article. The slip ratio of the rubber specimen to the road surface was varied from 0 to 70% under the conditions of speed of 20 km/h, load of 4 kgf and outside air temperature of 5° C. and 40° C. and the maximum friction coefficient value detected during the test was read. The friction coefficient of each specimen was respectively represented as an index based on the friction coefficient of Comparative Example 1 as 100. The larger the value is the larger and better the gripping performance.

(Steering Stability)

A tire was prepared using the obtained vulcanized rubber for the tread. Actual driving test was conducted on an asphalt test course using a vehicle to which the obtained tire was mounted. The controlling stability when steering was evaluated by the test driver on a scale of 5. The larger the value is the better the steering stability is. (5: excellent, 4: good, 3: normal, 2: poor, 1: bad)

(Abrasion Resistance)

The car on which the above tire was mounted was run for 20 laps on the test course. The depths of the grooves before and after running were measured and the depth was represented as an index based on the depth of Comparative Example 1 as 100. The larger the value is the better the abrasion resistance is.

(Bleeding Resistance)

The surface of the tire was observed and the degree of bleeding of oily substances was visually evaluated.

○: no bleeding

Δ: some bleeding

×: significant bleeding

The evaluation results of the above tests are shown in Table 3.

ping performance are highly balanced and bleeding of the compound is inhibited, and a tire using the composition.

What is claimed is:

1. A rubber composition comprising
   (B) 10 to 200 parts by weight of a low molecular weight aromatic vinyl-conjugated diene copolymer having weight average molecular weight of $1.0 \times 10^3$ to $1.0 \times 10^5$ and aromatic vinyl content of 10 to 75% by weight, wherein the hydrogenation ratio of double bonds in the conjugated diene part is 20 to 55%,
   based on (A) 100 parts by weight of a rubber component containing at least 60% by weight of a styrene-butadiene copolymer having weight average molecular weight of $5.0 \times 10^5$ to $2.5 \times 10^6$ and styrene content of 10 to 60% by weight, wherein the amount of vinyl bonds in the butadiene part is 20 to 70%;
   which satisfies the following relationship $$5\% \text{ by weight} < Bv < (As + 10\% \text{ by weight})$$

when As (% by weight) is the styrene content of said styrene-butadiene copolymer (A) and Bv (% by weight) is the aromatic vinyl content of said low molecular weight aromatic vinyl-conjugated diene copolymer (B).

TABLE 3

|  | Ex. | | Com. Ex. | | | | | |
| --- | --- | --- | --- | --- | --- | --- | --- | --- |
|  | 1 | 2 | 1 | 2 | 3 | 4 | 5 | 6 |
| Composition (parts by weight) | | | | | | | | |
| Copolymer A-1 | 100 | — | 100 | 100 | 100 | 100 | 100 | — |
| Copolymer A-2 | — | 100 | — | — | — | — | — | — |
| Copolymer A-3 | — | — | — | — | — | — | — | 100 |
| Copolymer B-0 | — | — | 40 | — | — | — | — | — |
| Copolymer B-1 | 40 | 40 | — | — | — | — | — | 40 |
| Copolymer B-2 | — | — | — | 40 | — | — | — | — |
| Copolymer B-3 | — | — | — | — | 40 | — | — | — |
| Copolymer B-4 | — | — | — | — | — | 40 | — | — |
| Copolymer B-5 | — | — | — | — | — | — | 40 | — |
| Carbon black | 70 | 70 | 70 | 70 | 70 | 70 | 70 | 70 |
| Softening agent | 30 | 30 | 30 | 30 | 30 | 30 | 30 | 30 |
| Stearic acid | 2 | 2 | 2 | 2 | 2 | 2 | 2 | 2 |
| Zinc oxide | 2 | 2 | 2 | 2 | 2 | 2 | 2 | 2 |
| Antioxidant | 1 | 1 | 1 | 1 | 1 | 1 | 1 | 1 |
| Sulfur | 1 | 1 | 1 | 1 | 1 | 1 | 1 | 1 |
| Vulcanization accelerator | 1.5 | 1.5 | 1.5 | 1.5 | 1.5 | 1.5 | 1.5 | 1.5 |
| Evaluation results | | | | | | | | |
| Gripping performance 5° C. | 108 | 110 | 100 | 90 | 112 | 108 | 100 | 92 |
| Gripping performance 40° C. | 114 | 105 | 100 | 118 | 105 | 115 | 101 | 100 |
| Steering stability | 4 | 4 | 3 | 5 | 4 | 5 | 3 | 3 |
| Abrasion resistance | 115 | 119 | 100 | 114 | 120 | 115 | 99 | 117 |
| Bleeding resistance | ○ | ○ | ○ | ○ | Δ | × | ○ | Δ |

According to the present invention, by compounding a low molecular weight aromatic vinyl-conjugated diene copolymer having a specific hydrogenation ratio to a styrene-butadiene copolymer rubber having a specific microstructure, and furthermore defining the styrene content of the styrene-butadiene copolymer rubber composition and the aromatic vinyl content of the low molecular weight aromatic vinyl-conjugated diene copolymer, there can be provided a rubber composition, in which abrasion resistance and grip- 2. The rubber composition of claim 1, wherein the amount of vinyl bonds in the butadiene part of said styrene-butadiene copolymer (A) is 20 to 60%.

3. A tire having a tread, wherein a least a portion of the tire is formed from the rubber composition of claim 1.

4. A tire having a tread wherein at least a portion of the tire is formed from the rubber composition of claim 2.

* * * * *